United States Patent

Borsati

[11] Patent Number: 5,361,878
[45] Date of Patent: Nov. 8, 1994

[54] DYNAMIC TWO FREQUENCY VIBRATION DAMPER

[75] Inventor: Luciano Borsati, Vico Canavese, Italy

[73] Assignee: Alenia Aeritalia & Selenia S.P.A., Rome, Italy

[21] Appl. No.: 7,138

[22] Filed: Jan. 21, 1993

[30] Foreign Application Priority Data

Jan. 21, 1992 [IT] Italy ............................ TO92A000037

[51] Int. Cl.⁵ ............................................. F16F 15/00
[52] U.S. Cl. .................................. 188/378; 248/559; 267/136
[58] Field of Search .................... 188/378, 379, 380; 267/136; 248/559, 636, 562, 648; 74/574; 244/17.27, 119; 416/508

[56] References Cited

U.S. PATENT DOCUMENTS

| | | | |
|---|---|---|---|
| 1,855,570 | 4/1932 | Edison | 188/378 X |
| 2,715,951 | 8/1955 | Lieber | 188/378 |
| 3,306,399 | 2/1967 | Flannelly | 188/378 |
| 4,203,546 | 5/1980 | Raquet et al. | 188/378 X |
| 4,420,134 | 12/1983 | Flannelly | 244/17.27 X |
| 4,527,951 | 7/1985 | Trier | 188/378 X |
| 4,641,809 | 2/1987 | Beer | 248/559 |
| 4,852,848 | 8/1989 | Kucera | 248/559 |

FOREIGN PATENT DOCUMENTS

| | | |
|---|---|---|
| 0214825A2 | 3/1987 | European Pat. Off. . |
| 0236248A1 | 9/1987 | European Pat. Off. . |
| 864178 | 7/1949 | Germany . |

OTHER PUBLICATIONS

Database WPIL; Section PQ, Week 9017, Derwent Publications Ltd., London, GB; Class Q, AN 90-130294 & SU-A-1 490 344 (Yarysh).

Primary Examiner—Douglas C. Butler
Attorney, Agent, or Firm—Herbert Dubno

[57] ABSTRACT

A damper, especially for a structural element of an aircraft and especially a propeller driven aircraft in which the propeller generates vibration in the structural element with a fundamental frequency and a frequency which is a harmonic of the fundamental frequency. The damper has a cantilever bar which can be flexed and a cup-shaped pendulum element affixed to the bar and tunable so that the mass of the pendulum defines a first eigenfrequency of vibration of the damper corresponding to the fundamental and the moment of inertia about an axis perpendicular to the axis of the bar is tuned to a second eigenfrequency corresponding to the fundamental.

12 Claims, 2 Drawing Sheets

DYNAMIC TWO FREQUENCY VIBRATION DAMPER

FIELD OF THE INVENTION

The present invention relates to a dynamic vibration damper and, more particularly to a vibration damper which is especially suited for aeronautical applications, but not exclusively so.

BACKGROUND OF THE INVENTION

The aeronautical industry is often faced with the need to reduce the level of vibrations generated by the rotating masses of an aircraft and transmitted to structural parts thereof.

In particular, in the case of propeller driven aircraft, the propeller blades generate pressure waves in the air surrounding the aircraft, propagating according to known laws and which give rise to periodic loads of significant magnitude on the fuselage and which generate the characteristic low frequency noise of such type of aircraft.

A frequency analysis of the amplitude of the pressure waves shows that the fundamental frequency has the same frequency as the angular velocity of the rotating propeller multiplied by the number of propeller blades and is generally of the order of tens of Hertz; also the first harmonic has a considerable amplitude and has a frequency twice that of the fundamental.

To cut back the noise mentioned above, at present use is made of dynamic dampers, having a resonating mass, tuned to a specific frequency and anchored to the structure whose vibration to be damped. Therefore to damp more than one frequency, entrusted to two sets of different dampers, tuned to the respective frequencies, are provided.

This causes the obvious inconvenience of fitting double dampers, each manufactured to high precision standards and each individually tuned to the required frequency to compensate for the inevitable spread of the resonating frequencies due to manufacturing tolerances and installation inaccuracies.

OBJECT OF THE INVENTION

The object of this invention is to provide a dynamic damper which is free from the drawbacks described above and characterizing presently known dampers.

SUMMARY OF THE INVENTION

The aforementioned object is met by the present invention, which provides a dynamic damper formed by a flexible bar, means for connecting this bar to a structural element whose vibrations are to be damped and a pendulum connected to the bar. The mass of the pendulum establishes first oscillating eigenfrequency of the damper. The pendulum has an inertia around an axis perpendicular to the bar at rest set so as to define a second oscillating eigenfrequency of the damper at a pre-defined value.

With this invention it is therefore possible to tune the damper to two distinct frequencies, although only a single pendulum is used. The pendulum may be dimensioned so that one frequency is twice the other and, when the damper is applied to a propeller driven aircraft, these frequencies coincide with the fundamental and first harmonic of the pressure waves generated by the propeller.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
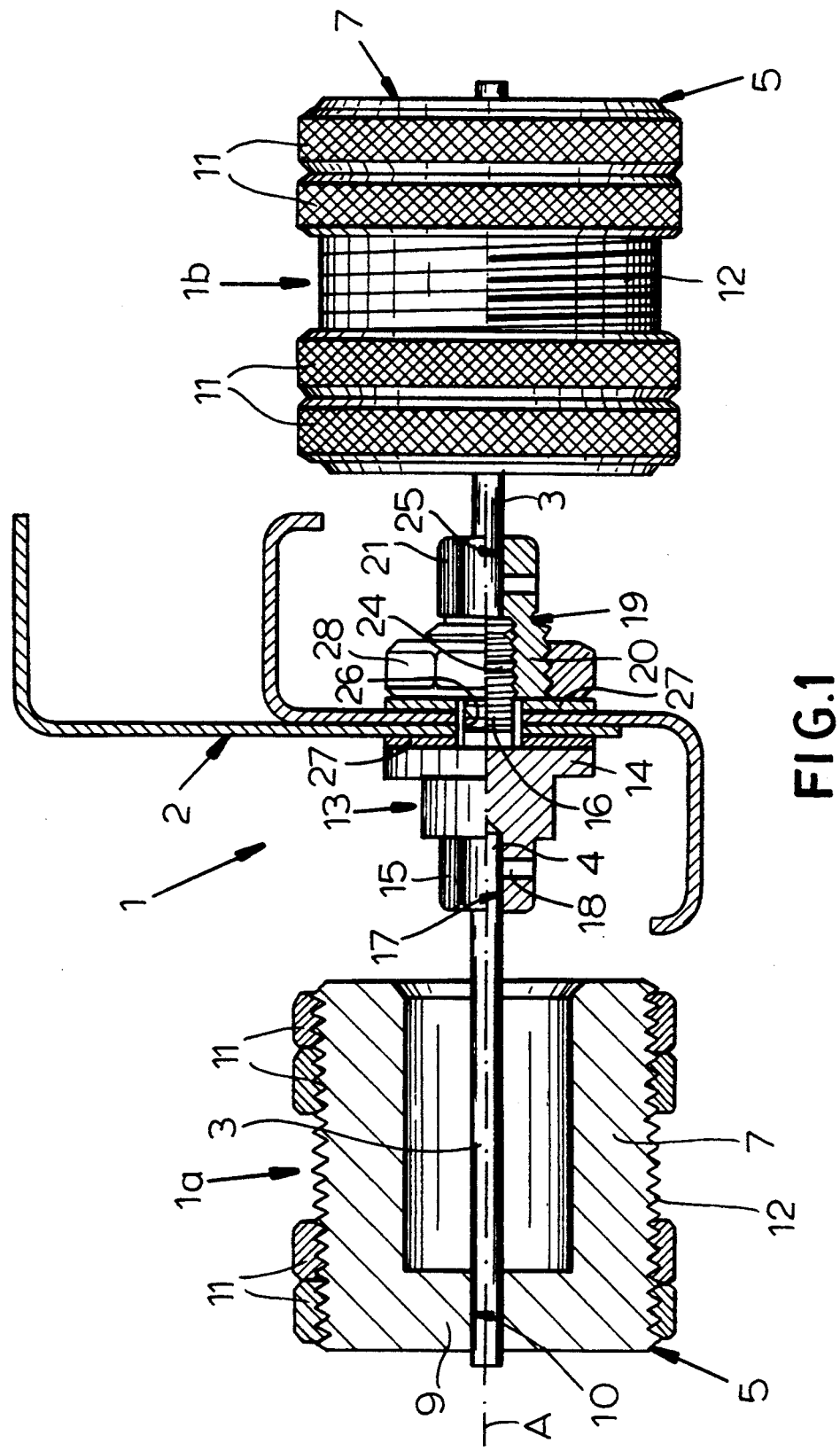
FIG. 1 is a lateral elevation and part section of a pair of dampers built in accordance with the present invention and applied to a structural element of an aircraft.

In the drawing, I shows a dynamic damper 1 applied to a structural element 2 of an aircraft, in particular a propeller-driven aircraft.

The element 2 in use is subjected to vibrations caused by the forces acting on the element itself ( or transmitted to it arising from other structural elements) by the pressure waves generated by the propellers of the aircraft. Such pressure waves have large amplitude low frequency components. In particular, the fundamental frequency has a high amplitude at a frequency equal to the propeller rotating frequency times the number of blades, and the first harmonic has a high amplitude at a frequency equal to twice that of the fundamental.

Damper 1 consists essentially of a pair of similar dampers 1a and 1b, set on opposite sides of structural element 2 as described in the following.

Damper 1a consists of a circular section bar 3, one end 4 of which is rigidly connected to element 2 and of a pendulum 5 fixed to the bar 3 at its free end. Bar 3 can be flexed and when at rest it has a straight line axis A.

Pendulum 5 includes a cup element 7 with a cylindrical wall and a circular end wall 9, set at the end of body 5 furthest from element 2. The free end of bar 3 is engaged in an axial hole 10 in end wall 9, so as to constitute a joint and is held in the hole by laser welding.

Pendulum 5 also includes two pairs of ring nuts 11 screwed on the externally threaded cylindrical wall of cup element The ring nuts 11 may be run along the axis of the cup element so as to vary its mass distribution and therefore also the associated moment of inertia around an axis perpendicular to axis A.

The ring nuts 11 are set in pairs so that tightening the nuts of each pair against one another is sufficient to block them in position according to the nut and counternut principle.

Damper 1a also a support 13 of the connection of bar 3 to element 2. This support is formed by an intermediate circular flange coupling 14, from which a hexagonal nut 15 and a threaded shank 16 extend in opposite directions.

Part 15 has an axial blind hole 17 into which the end 4 of the bar 3 is inserted and there held by laser welding, performed by projecting a laser beam through radial holes 18 (one of which is shown) of the part 15.

Damper 1b is identical to 1a as far as the dynamically active parts are concerned, i.e. the bar and the pendulum, which are therefore not described and are designated by the same reference numerals used for the corresponding parts of damper 1a.

Damper 1b differs from damper 1a described above in terms of its support 19. Support 19 consists of a cylindrical bushing 20 and coaxial hexagonal nut 21.

Bushing 20 and nut 21 have respectively a threaded hole 24 and a smaller diameter cylindrical hole 25, coaxial with one another and intercommunicating, so as to define a through cavity in support 19.

An end of the bar 3 of damper 1b is inserted into hole 25 and there held in the same manner described above.

Dampers 1a and 1b are set on opposite sides of structural element 2 and lie on the same axis, so that the threaded shank 16 of support 13 of damper 1, which passes through hole 26 of structural element 2, is screwed completely into threaded hole 24 of support 19 of damper 1b.

Two ring washers 27 are suitably positioned between structural element 2 and flange 14 of support 13 and bushing 20 of support 19.

Moreover, a counter nut 28 is screwed onto externally threaded bushing 20 and, tightened against its own washer 27 so as to prevent unscrewing in operation of shank 16 and support 19.

The dynamic behavior of dampers 1a and 1b is identical and will therefore be described by referring to damper 1a alone.

Damper 1a may be schematically described in a first approximation, as a cantilever beam (representing bar 3) which can be elastically bent, on the free end of which a mass m is fixed (representing pendulum 5) which has moment of inertia due to mass equal to $J_m$ around an axis perpendicular to that of the beam.

As well known to the experts in this field, a similar system has two degrees of freedom (translation of the mass along the beam and rotation of the mass around an axis perpendicular to that of the beam) and therefore two oscillation eigenfrequencies, defined by the following expressions:

$$[1] f_1 = (k/m)^{1/2}/2\pi$$

$$[2] f_2 = (k_{ang}/J_m)^{1/2}/2\pi$$

where k is the bending rigidity of the beam, i.e. the ratio between the force applied to the free end of the beam and the resulting elastic displacement, and $k_{ang}$ is the angular rigidity of the beam, i.e. the ratio between the bending moment applied to the end of the beam and the relative rotation of such section.

Bending rigidity k and angular rigidity $k_{ang}$ of the beam are analytically defined by the well known formulae:

$$[3] k = 3EJ_b/l^3$$

$$[4] k_{ang} = EJ_b/l,$$

where E is the elasticity modulus of the material, $J_b$ is the moment of inertia of the section of the beam and l is the length of the beam.

According to this invention, parameters k, $k_{ang}$, m and $J_m$ are selected so as to define two frequencies $f_1$ and $f_2$ equal to the excitation fundamental frequency (i.e. the fundamental frequency of the pressure waves generated by the propeller blades) and to the first harmonic frequency thereof.

In particular, once the geometry of bar 3 has been fixed (therefore fixing k and $k_{ang}$) and the mass of pendulum 5 selected so that its first eigenfrequency of vibration is equal to the fundamental frequency of the pressure waves, moment of inertia $J_m$ may be selected so that the second eigenfrequency of vibration of the damper is identical to that of the first harmonic of the pressure waves.

As we have already seen, the two degree of freedom model described above is totally inadequate to calculate the eigenfrequencies of vibration of the damper with accuracy and therefore, for a sufficiently accurate determination of its dimensional characteristics (in essence m and $J_m$) so as to determine such frequencies.

It is therefore necessary in practice to dimension the damper through more complex modelling.

In particular, concentrated mass and rigidity calculation methods may be adopted, such as the Prohl method, or the finite element method for an even more accurate theoretical determination.

Manufacturing tolerances create some of dispersion (spread) of the vibration eigenfrequency around values calculated theoretically so that it is at any rate necessary, however accurate the calculation, to effect with an empirical tuning of the damper by shifting the ring nuts 11 along the pendulum. The operation of the damper 1a (and 1b) is that typical of known dynamic dampers, with the difference that damper 1a (and 1b) can oscillate at resonance at two distinct frequencies, each fully presettable, and is therefore capable of cutting back the vibrations at such frequencies which act upon the structure to which it is attached.

As such frequencies coincide with the excitation frequencies having the greatest intensity, the vibrations of the structure are substantially eliminated.

A further advantage of damper 1a (and 1b), compared to known dampers, is its capability to vibrate not only in one preferred direction, but in any direction contained in a plane perpendicular to its axis, due to the axial symmetry of the damper itself.

The installation of two opposite pairs of dampers 1a and 1b eliminates the bending forces acting on structural element 2 in the area where the dampers are connected, as the bending moments created by them in use are equal and opposite.

Figure 2:
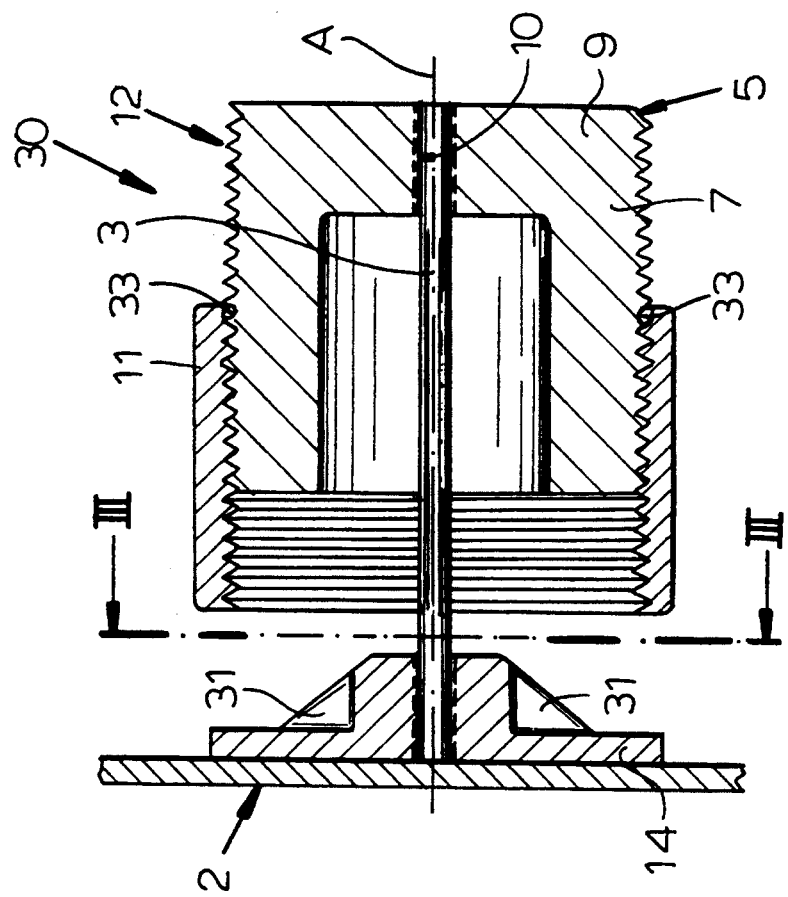
FIG. 2 is a section of another damper according to a embodiment of this invention, applied to a structural element.
Figure 3:
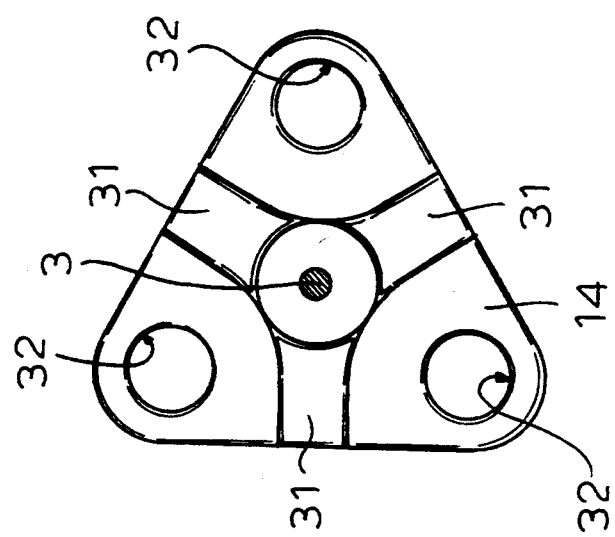
FIG. 3 is a section along line III—III of FIG. 2.

With reference to FIGS. 2 and 3, a dynamic damper 30 is illustrated according to a simplified implementation of this invention. Damper 30 is described briefly in the following, as it differs from dampers 1a and 1b, and where the same numbers are used to indicate parts which are similar or identical to parts already described with reference to FIG. 1.

In particular, damper 30 includes a bar 3 having circular section, on one of which an anchoring flange 14 to structural element 2 and on an opposite end of which a pendulum 5 are solidly connected, by laser welding for example.

Flange 14 is substantially triangular and is provided with radial reinforcing ribs 31 and through-holes 32 which serve the purpose of fixing the damper to structural element 2 by means of screws, which are not shown.

Pendulum 5 consists of a cup element 7 which is threaded externally, onto which a single ring nut 11 is screwed to tune the damper.

Ring nut 11 is axially locked onto cup 12, in the position corresponding to the required oscillation eigenfrequencies, by laser welding in one or more points.

The operation of this damper 30 and its related advantages are very similar to those of dampers 1a and 1b and are therefore not described for brevity.

It is finally clear that dampers 1a, 1b and 30 may be subject to modifications and changes which are included in the scope of protection of this patent.

In particular, the implementation characteristics of FIGS. 1 and 2 may be combined in any fashion to achieve dampers which can be installed alone or in pairs on a structural element, and fixed to the structural element itself; moreover, the shape of pendulum 5 may be varied so long as the geometric and mass parameters are such as to result in two own vibration frequencies in accordance with this invention. The tuning of these frequencies may also be effected in any other manner, such as through holes having appropriate size and position on cup element 7.

The dampers in accordance with this invention may obviously be applied not only to aeronautic structures, but also to any other type of structure, such as parts of cars, ground vehicles etc.

Tuning may be performed in such cases so as to result in two eigenfrequencies of vibration of the damper which coincide with two eigenfrequencies of vibration of the structure, such as the first and the second.

I claim:

1. A dynamic vibration damper comprising:
   flexible bar;
   means for fixing the bar in a cantilever position onto a structural element with vibrations to be attenuated; and
   a pendulum connected rigidly to the bar, said pendulum being provided with means including a mass (m) for defining a first eigenfrequency of vibration ($f_1$), and for imparting to said pendulum a moment of inertia ($J_m$) around an axis perpendicular to an axis of said bar in a rest position of said bar, selected so as to define a second eigenfrequency of vibration ($f_2$) of the damper at a pre-fixed value which is an integral multiple of the first eigenfrequency ($f_1$).

2. The damper according to claim 1, wherein said second eigenfrequency ($f_2$) is equal to twice said first eigenfrequency ($f_1$).

3. The damper in accordance with claim 1, wherein said pendulum includes a cup element which lies on said axis of said bar and is connected to said bar by an end plate of the cup element which is set at an end of said cup element opposite to said structural element.

4. The damper according to claim 3, wherein said means for fixing includes a supporting element which can be connected to said structural element and is equipped with a seat for axial insertion of said bar, the bar being locked to the supporting element by a laser weld.

5. The damper according to claim 1, which includes tuning means for setting at least one of said eigenfrequencies ($f_1$, $f_2$).

6. The damper according to claim 5 wherein said tuning means includes at least one ring nut which can be moved axially along an outer wall of said cup element.

7. The damper according to claim 6, further comprising a device for blocking said ring nut in a selected axial position.

8. The damper according to claim 7 wherein said device is at least one weld point.

9. The damper according to claim 6, which includes at least a pair of said ring nuts screwed onto an external thread formed on said cup element, the ring nuts being tightened together so as to lock them into position.

10. The damper according to claim 9 which includes two pairs of said ring nuts.

11. A vibration damper for a structural element of an aircraft having a fundamental frequency of vibration and a harmonic which is an integral multiple of the fundamental frequency, said damper comprising:
    a support element affixed to said structural element and provided with a hole;
    a circular cross section bar having one end received in said hole and fixed to said support element and cantilevered by said support element on said structural element, said bar being elastically deformable in flexure and in torsion; and
    a pendulum on an opposite end of said bar, said pendulum being in the shape of a cup open toward said support element and having a transverse wall receiving said opposite end of said bar and affixed thereto at an end of said cup turned away from said support element, said cup having a cylindrical externally threaded wall and being provided with a tuning ring threaded onto said wall and axially displaceable therealong, means being provided to fix said ring on said wall in a position in which the damper is tuned, said pendulum having means including a mass (m) for defining a first eigenfrequency of vibration ($f_1$) corresponding to said fundamental frequency and for imparting to said pendulum has a moment of inertia ($J_M$) around an axis perpendicular to an axis of said bar in a rest position of said bar selected so as to define a second eigenfrequency of vibration ($f_2$) corresponding to said harmonic.

12. The vibration damper defined in claim 11 wherein said structural element has a hole extending through said structural element between opposite sides thereof, said support element being provided with a flange juxtaposed with one side of said structural element and a threaded shank extending through said hole in said structural element to an opposite side thereof, said damper further comprising:
    an internally and externally threaded bushing threaded onto said shank;
    a nut threaded onto said bushing and clamped against said structural element;
    another bar of circular cross section having one end received in and fixed to said bushing and cantilevered by said bushing on said structural element;
    another pendulum having a cup shaped configuration open in the direction of said bushing and formed with a transverse wall anchored to said other bar, each of said pendulums being provided with two pairs of internally threaded tuning rings thereon locked against one another for tuning the respective pendulums to said first and second eigenfrequencies respectively.

* * * * *